United States Patent [19]
Gombos

[11] Patent Number: 5,961,696
[45] Date of Patent: Oct. 5, 1999

[54] METHOD OF AND APPARATUS FOR INSTALLING FILTER CARTRIDGES IN A DUST COLLECTOR

[75] Inventor: Thomas Michael Gombos, Munhall, Pa.

[73] Assignee: Airotech, Inc., Homestead, Pa.

[21] Appl. No.: 08/142,772

[22] Filed: Oct. 25, 1993

[51] Int. Cl.$^6$ .................................................. B01D 46/00
[52] U.S. Cl. ................................. 95/273; 55/493; 55/502
[58] Field of Search ............................ 55/493, 498, 502, 55/504, 508, 511; 95/273

[56] References Cited

U.S. PATENT DOCUMENTS

| | | | |
|---|---|---|---|
| 3,393,498 | 7/1968 | Schoen | 55/493 |
| 3,525,200 | 8/1970 | Smith | 55/504 X |
| 3,593,503 | 7/1971 | Andrews | 55/493 |
| 4,141,704 | 2/1979 | Berglund | 55/493 |
| 4,217,122 | 8/1980 | Shuler | 55/493 |
| 4,266,956 | 5/1981 | Revell | 55/504 X |
| 4,322,231 | 3/1982 | Hilzendeger et al. | 55/504 X |
| 4,632,681 | 12/1986 | Brunner | 55/493 |
| 4,767,427 | 8/1988 | Barabas et al. | 55/493 |

*Primary Examiner*—Duane S. Smith
*Attorney, Agent, or Firm*—Thorp Reed & Armstrong, LLP

[57] ABSTRACT

A dust collector having opposing guide rails for aligning filter cartridges with the apertures defined by the collector chamber thereof so that the exhaust port of each filter cartridge is substantially aligned with the aperture to which the filter cartridge corresponds. The dust collector also comprises locking bars having free edges for moving the filter cartridges into a position where the filter cartridges contact the wall of the collector chamber which defines the apertures which form part of the air outlet pathway of the dust collector; clamps for removably securing the filter cartridges in that position; and wherein the guide rails support the filter cartridges within the collector chamber while they are being aligned therein.

11 Claims, 9 Drawing Sheets

METHOD OF AND APPARATUS FOR INSTALLING FILTER CARTRIDGES IN A DUST COLLECTOR

FIELD OF THE INVENTION

The present invention relates to dust collectors for industrial use and, more particularly, to a method of and apparatus for installing filter cartridges into a dust collector or other pollution control device.

BACKGROUND OF THE INVENTION

The present invention relates to improvements in the methods of and components used for installing filter cartridges in the housings of dust collectors for industrial use.

As is known in the prior art, the typical filter cartridge is cylindrical in shape, with its body comprising folds of filter material for filtering out dust and other particulates from the air entering the dust collector. The dirty air passes through the folded filter material in the body of the cartridges as it is drawn out of the dust collector housing through exhaust ports in the tops of the cartridges. Those exhaust ports communicate with apertures in the ceiling of the dust collector chamber which comprise a part of the air outlet pathway located in the top of the collector housing for exhausting the filtered air from the dust collector.

In the prior art dust collectors, installing the filter cartridges was a laborious and time-consuming process. Typically, filter cartridges were bolted in place using various types of bolts and tools. In a prior art dust collector requiring twelve filter cartridges, the installation of those cartridges could take up to eight hours to complete due to the difficulty in securing the cartridges in the dust collector in proper alignment with the respective apertures in the ceiling of the collector housing which comprise part of its air outlet pathway. The cramped workspace within the collector housing, which is even more cramped when full of filter cartridges, is a major impediment to the quick and easy removal and installation of the filter cartridges in the prior art dust collectors.

Accordingly, it is the object of this invention to provide a new and improved method of and apparatus for installing filter cartridges into dust collectors which overcome the deficiencies in the prior art.

Another object of the present invention is to provide a new and improved method of and apparatus for installing the filter cartridges which greatly reduces the time required to replace the filter cartridges in a dust collector.

An additional object of the present invention is to provide a new and improved method of and apparatus for installing filter cartridges which allows for the quick and easy alignment of the filter cartridges with respective apertures in the ceiling of the collector chamber of the dust collector.

SUMMARY OF THE INVENTION

The present invention comprises an apparatus and method for aligning filter cartridges with the apertures defined by a collector chamber of a dust collector and for installing the cartridges therein so that the exhaust port of each filter cartridge is substantially aligned and tightly sealed with the aperture to which the filter cartridge corresponds.

The present invention also comprises a dust collector having means for moving the filter cartridges into a position where the gaskets of the filter cartridges are compressed against the wall of the collector chamber defining the apertures which form part of the air outlet pathway of the dust collector. Such compression provides for an airtight seal between the cartridges and the air outlet pathway. The present invention further comprises means for removably securing the filter cartridges in such position, and means for supporting the filter cartridges within the collector chamber while they are being aligned therein.

These and other features and advantages of the preferred embodiments of the present invention will become readily apparent from the following detailed description of the preferred embodiments and claims and from the accompanying drawings which illustrate certain preferred embodiments of the present invention.

BRIEF DESCRIPTION OF THE DRAWINGS

In the accompanying drawings, the preferred embodiments of the invention and preferred methods of practicing the invention are illustrated in which.

DETAILED DESCRIPTION OF THE PREFERRED EMBODIMENTS

Figure 1:
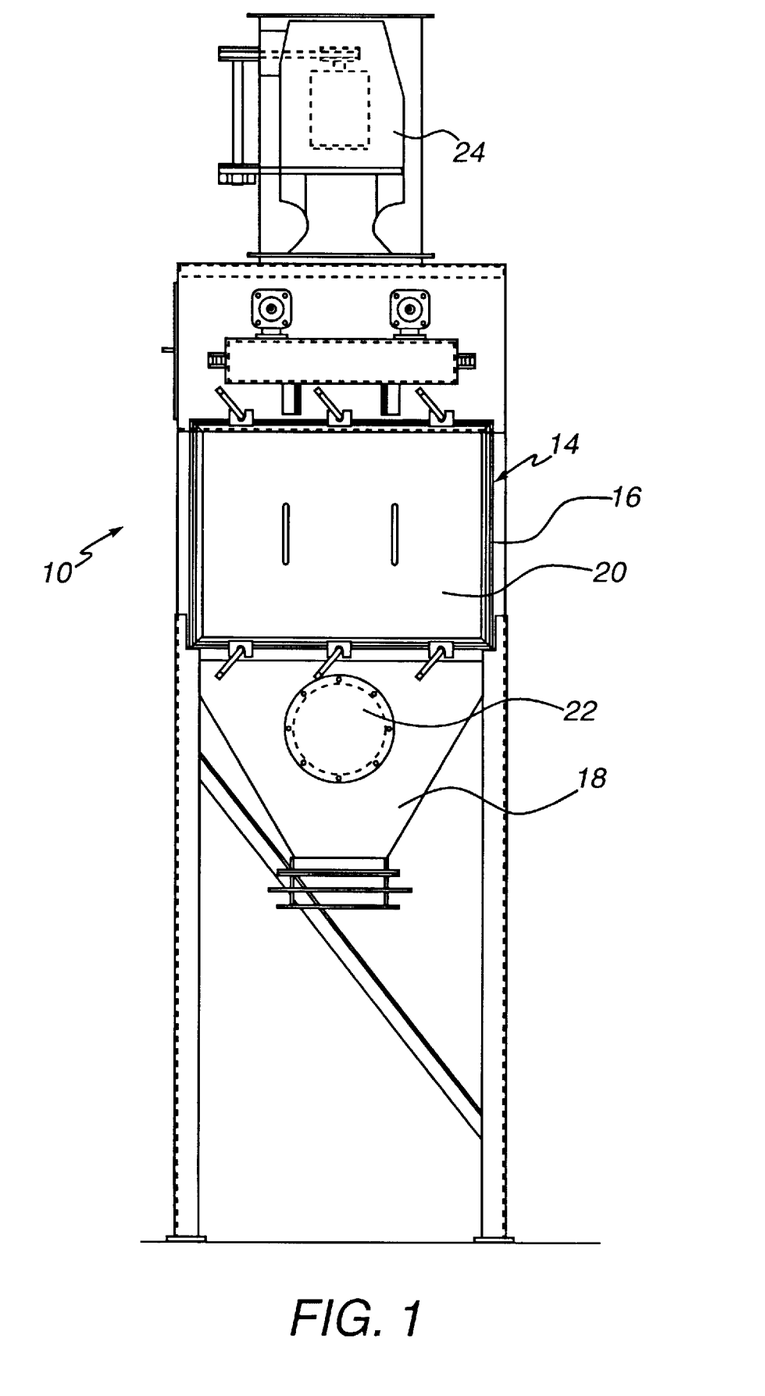
FIG. 1 is a front elevational view of the dust collector of the present invention.
Figure 2:
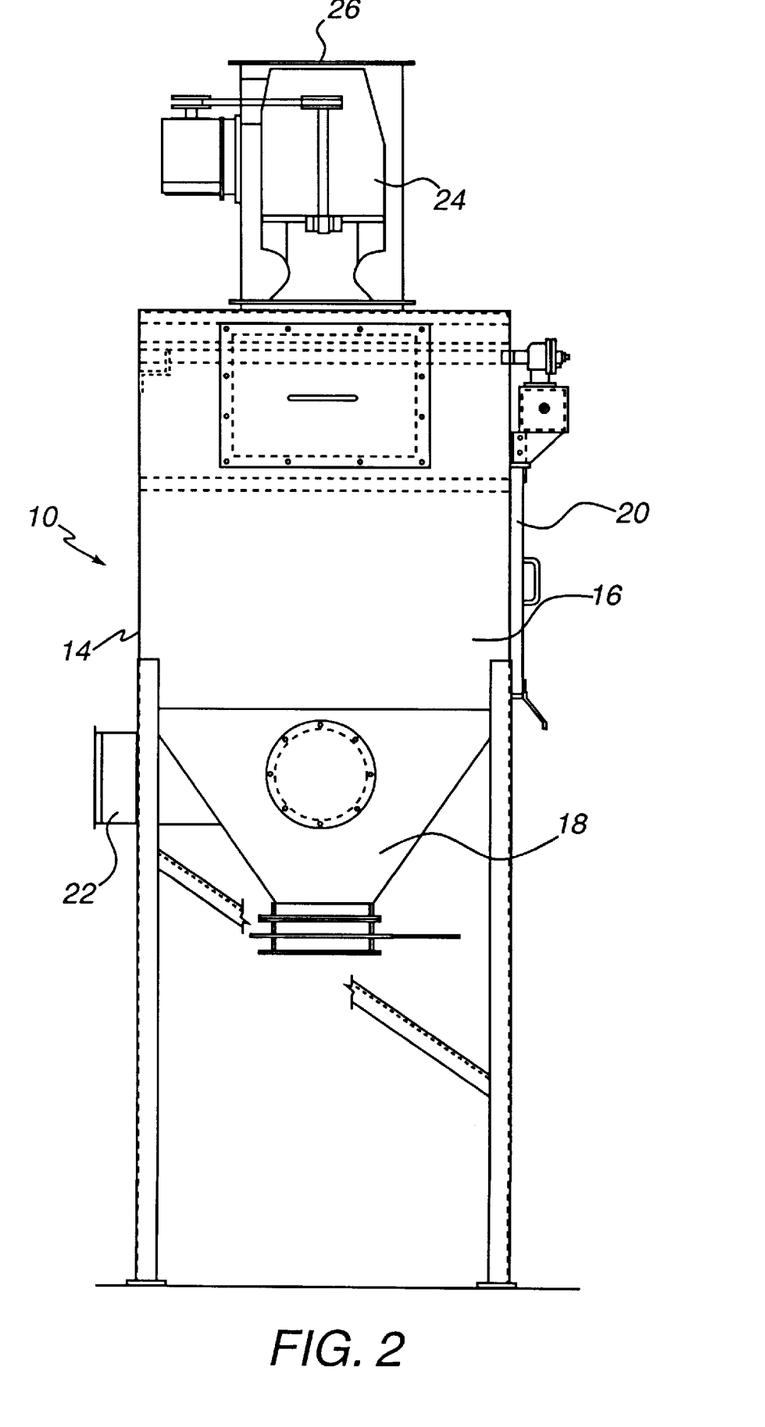
FIG. 2 is a side elevational view of the dust collector of FIG. 1.

FIGS. 1 and 2 show a preferred embodiment of the dust collector 10 having the components in accordance with the present invention for installing the cartridges 12 therein. The dust collector 10 comprises a housing 14 having a box-shaped upper portion 16 integrally formed with a lower hopper portion 18. A collector chamber 11 (as shown in FIG. 3) having a plurality of walls 15 is defined within the upper portion 16 of the collector housing 14.

Figure 3:
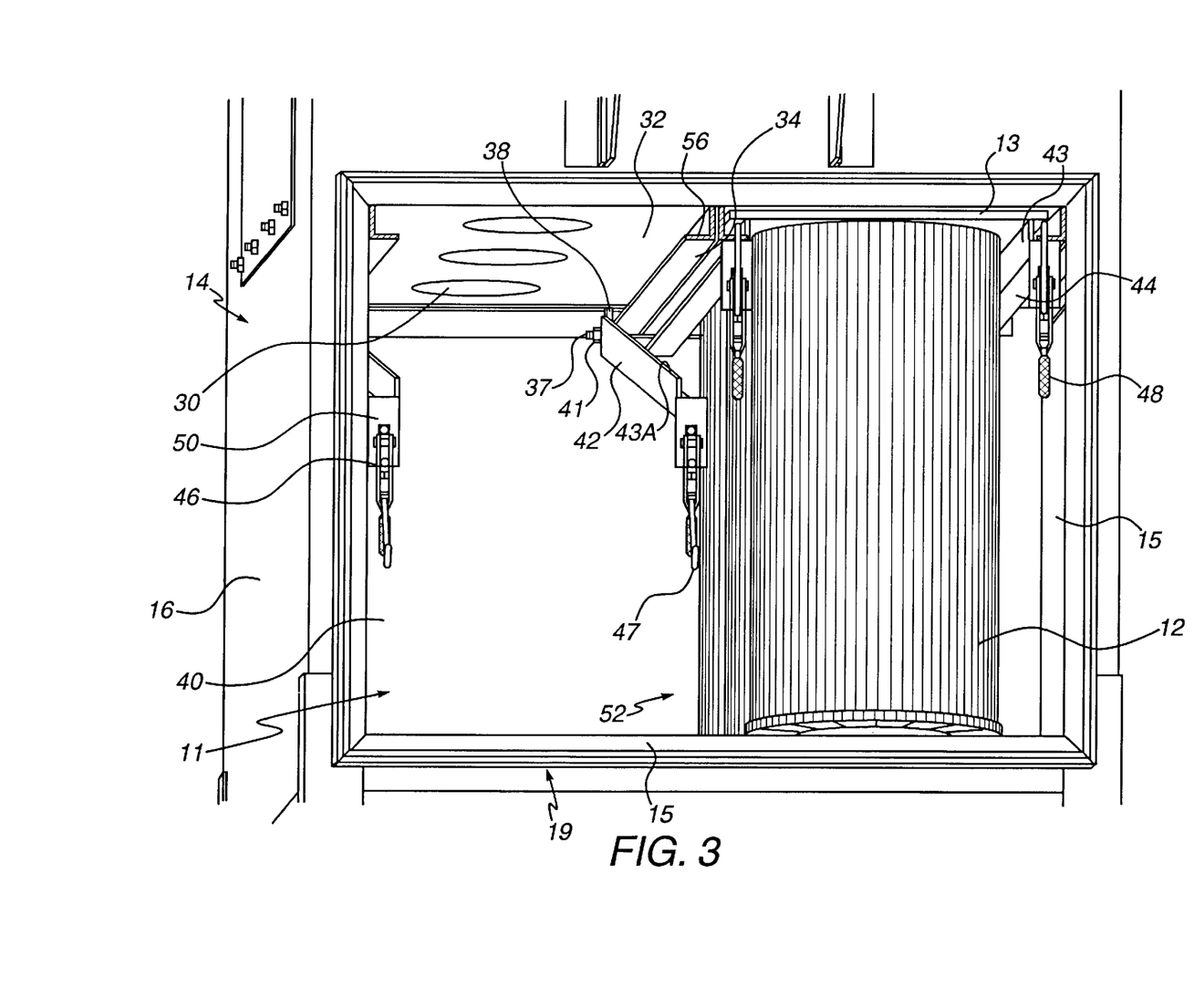
FIG. 3 is a front perspective view of the collector chamber of the dust collector having three filter cartridges installed therein in accordance with the present invention.
Figure 4:
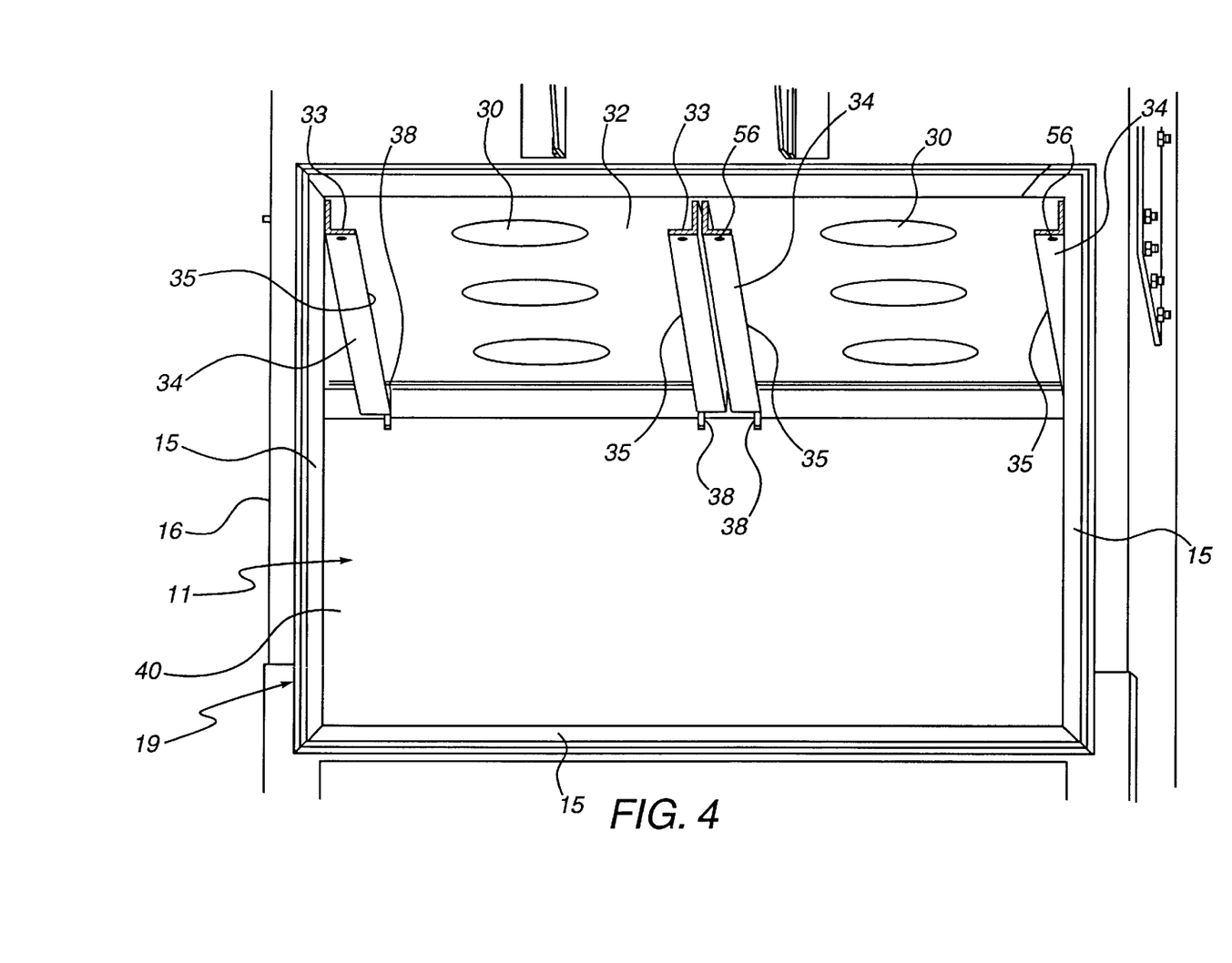
FIG. 4 is a front perspective view of the collector chamber of the dust collector of the present invention without the locking bars installed therein.

In FIG. 3, housing door 20, which seals access opening 19, has been removed to reveal the filter cartridges 12 mounted therein in accordance with the present invention. Air inlet conduit 22 communicates with the collector chamber 11 via the lower hopper portion 18 of housing 14. Air inlet conduit 22 allows the particulate-laden air to enter dust collector 10 at a position below the filter cartridges 12. The air entering dust collector 10 is drawn up through the filter cartridges 12 by a fan 24 mounted in the air outlet pathway 26 located in the top of the collector housing 14. The filtered air passes through an exhaust port 28 in the top of each cartridge 12 into a corresponding aperture 30 in the ceiling wall 32 of the collector chamber 11. Since the dust collector 10 of this particular embodiment contains six cartridges 12, it has six apertures 30 in its ceiling wall 32, as shown in FIG. 4. The apertures 30 comprise part of and communicate with the air outlet pathway 26 to permit the filtered air to exit the dust collector 10.

Figure 8:
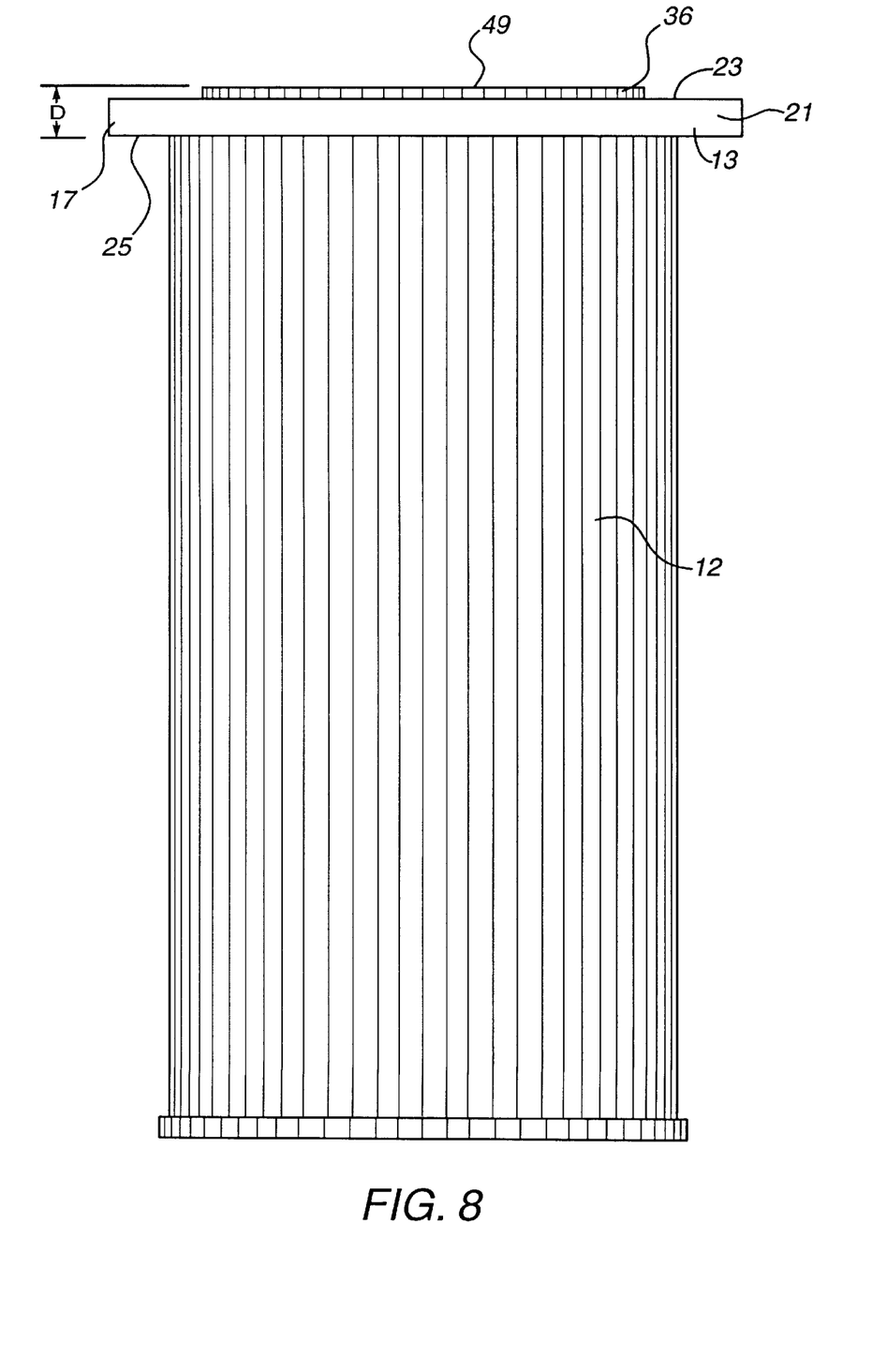
FIG. 8 is an elevational view of a filter cartridge according to the present invention.
Figure 9:
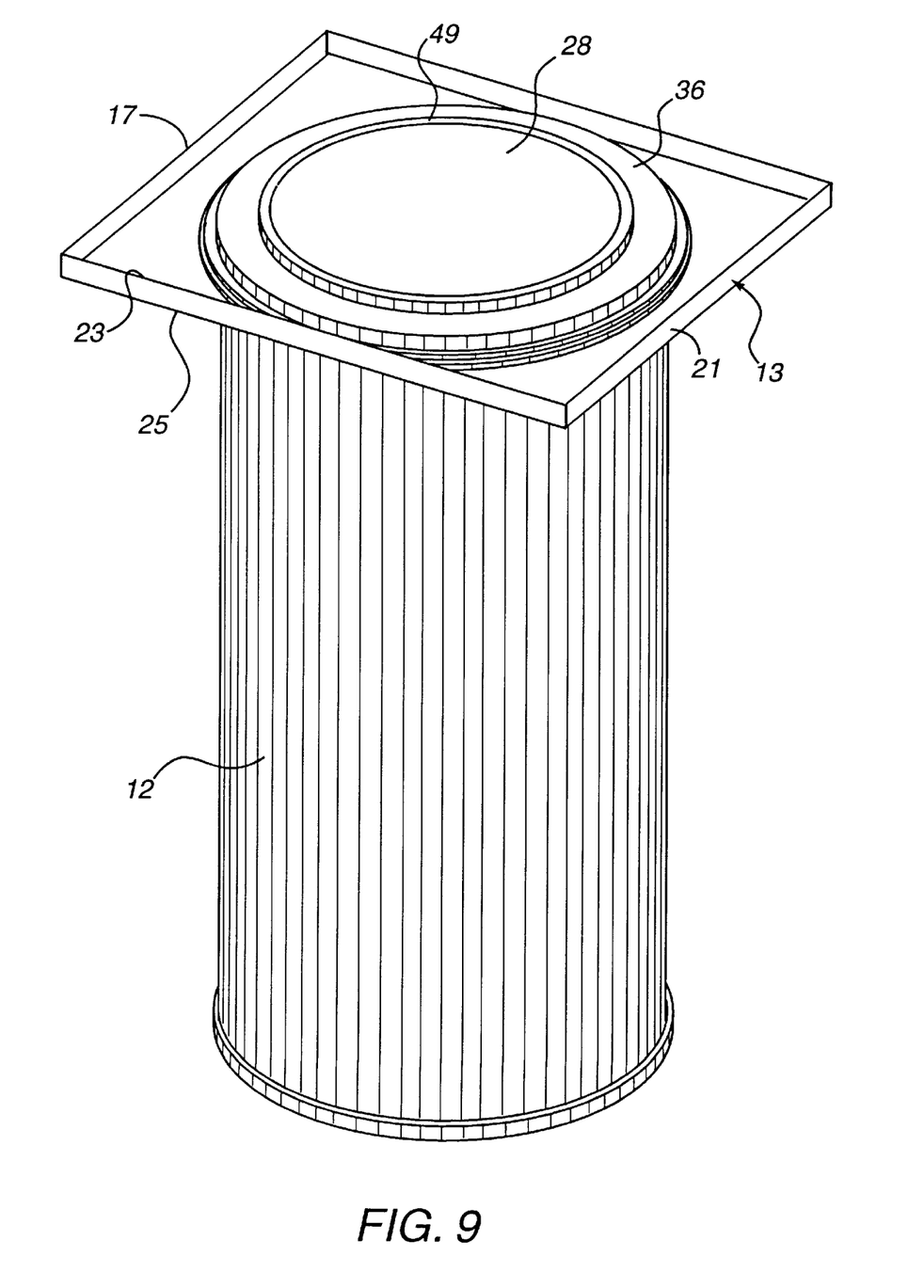
FIG. 9 is an top perspective view of a filter cartridge according to the present invention.

In order for the dust collector 10 to operate efficiently, the exhaust ports 28 in the top of each filter cartridge 12 (as shown in FIG. 9) must be precisely aligned with the corresponding apertures 30 in the ceiling wall 32 of the collector chamber 11. In addition, an airtight seal is required between the exhaust ports 28 and the apertures 30 to prevent dirty, unfiltered air from exiting the dust collector 10 through the air outlet pathway 26. The filter cartridges 12 must also be frequently cleaned or replaced to provide clean cartridges capable of filtering the particulates from the inlet air. As such, the cartridges 12 must be frequently removed and re-installed in the collector chamber 11. To facilitate the easy and frequent exchange of filter cartridges 12, the dust collector 10 of the present invention has L-shaped guide rails 34 mounted on the ceiling wall 32 of the collector chamber 11, as shown in FIGS. 3 and 4. Furthermore, each cartridge 12 is provided with a flange 13 disposed on its top end that surrounds exhaust port 28 therein. Each flange has a top edge 23 and a bottom edge 25. To provide for an airtight seal with the aperture 30 in the ceiling wall 32, a gasket 36 made of silicone rubber, neoprene or other suitable material is disposed on the top end of the filter cartridge 12 and also surrounds exhaust port 28, as shown in FIGS. 8 and 9.

Figure 5:
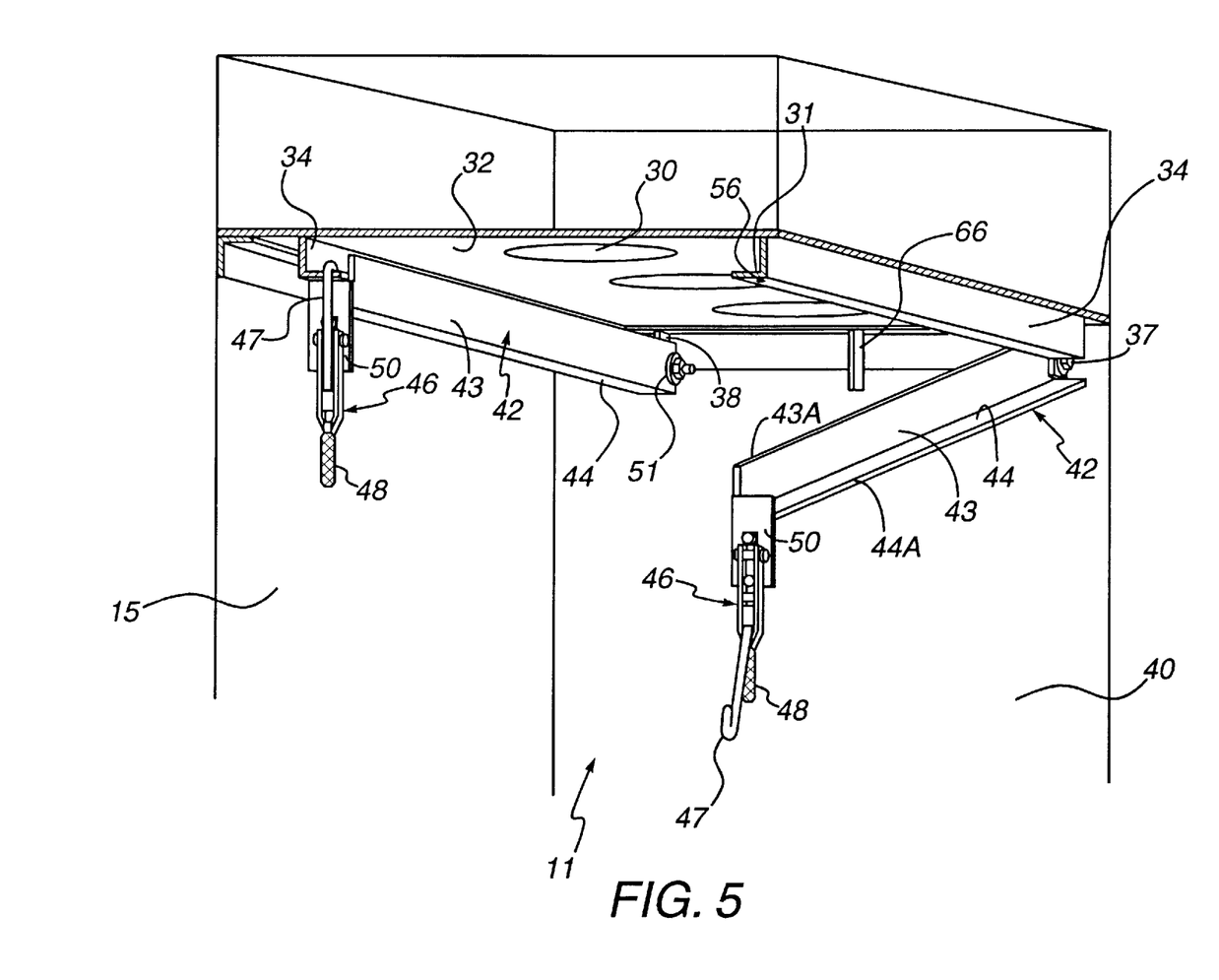
FIG. 5 is a schematic isometric partial breakaway view of the collector chamber of the dust collector of the present invention.

Pivot clips 38 are mounted on the ceiling wall 32 near the back wall 40 of the collector chamber 11. As shown in FIG. 4, a separate pivot clip 38 is provided for each guide rail 34. Each pivot clip 38 extends downwardly at right angles to the ceiling wall 32 and is located directly behind the guide rail 34 to which it corresponds. Each pivot clip 38 also has an opening (not shown) which allows a locking bar 42 to be pivotally mounted alongside each guide rail 34. A bolt 37, nut 41 and washer 51 combination is used to pivotally mount locking bar 42 to pivot clip 38, as shown in FIGS. 3 and 5. Each of the locking bars 42 can pivot between a first position wherein it extends along a line intersecting the plane of ceiling wall 32, and a second position wherein the locking bar 42 extends along a line substantially parallel to the ceiling wall 32. Each locking bar 42 has an elongated L-shape comprising a vertical side member 43 and a horizontal side member 44, when the locking bar 42 is in its horizontal, second position. The vertical side member 43 and the horizontal side member 44 each have a free edge, 43A and 44A respectively, which is unattached to the other respective side member.

The dust collector 10 of the present invention also comprises a means for releasably securing the locking bars 42 in their second, horizontal position. Such means for securing comprise a clamping mechanism 46, such as a DE-STA-CO Model 351-b clamp\lock, which is mounted to a plate 50 rigidly attached to the front end of each locking bar 42. The clamping mechanism 46 comprises an elongated hooked member 47 pivotally and rotatably connected to a lever member 48. The lever member 48 is pivotally connected to both the hooked member 47 and the plate 50.

Figure 6:
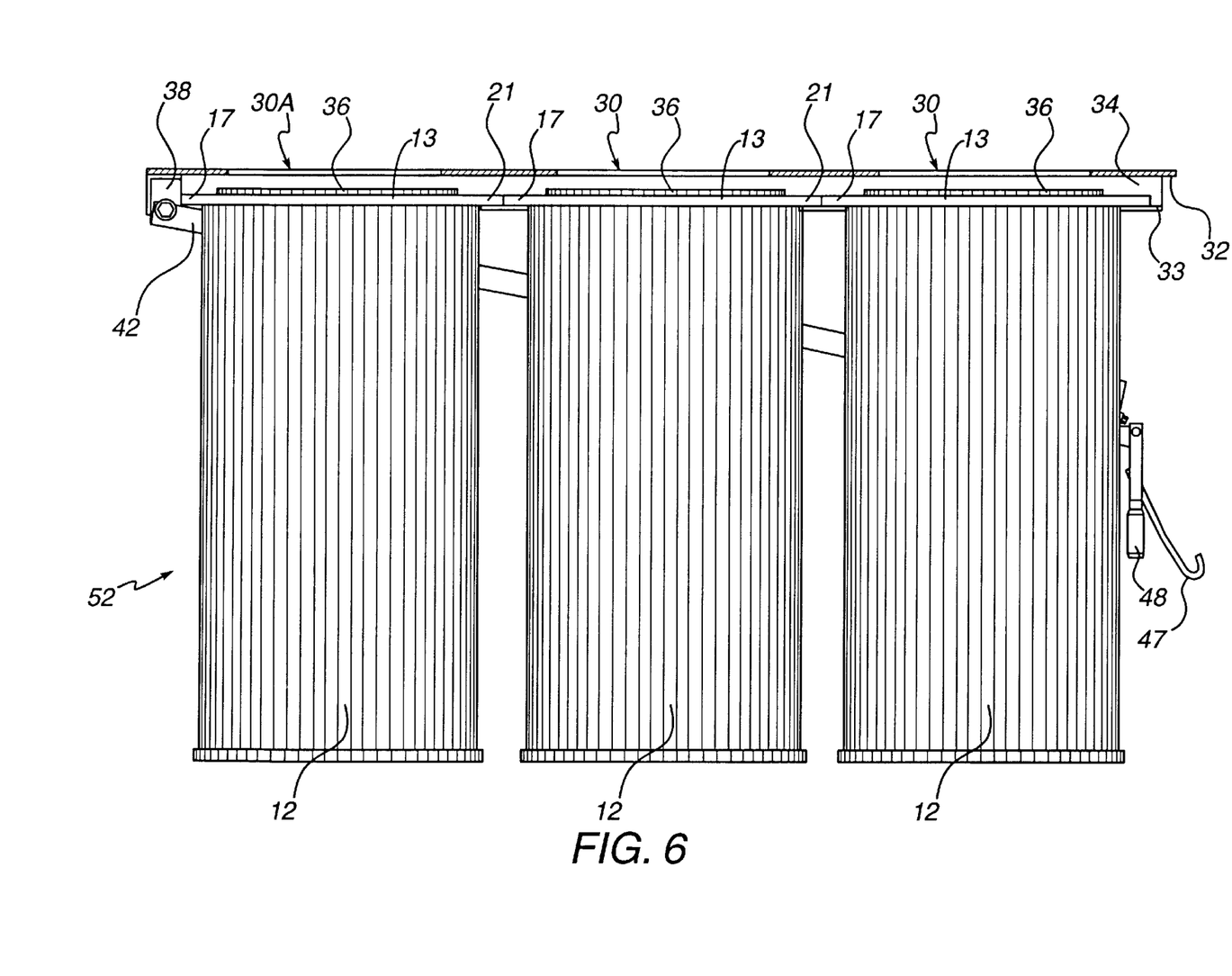
FIG. 6 is a schematic isometric partial breakaway view of the collector chamber of the dust collector showing three filter cartridges aligned therein in accordance with the present invention.

As seen in FIG. 3, the filter cartridge 12 is installed into the dust collector 10 by inserting its flange 13 between two opposing guide rails 34 that have been spaced to receive the flanged cartridge 12. As shown in FIGS. 3–6, the cartridges 12 are typically installed in a row 52 of at least two to three cartridges running from the front to the back of the collector chamber 11. As such, after the first cartridge is inserted between opposing guide rails 34, it is moved towards the back wall 40 until the front side 17 of its flange 13 contacts the pivot clips 38 mounted on either side of the row 52. The flange 13 of the filter cartridge is configured so that when its front side 17 contacts the pivot clips 38, the exhaust port 28 of that filter cartridge is longitudinally aligned with a first aperture 30A in row 52, as shown in FIG. 6. In addition, the guide rails 34 are precisely spaced relative to the width of the flange 13 so that the exhaust ports 28 and apertures 30 are laterally aligned when the cartridge 12 is inserted into the guide rails 34. Further, the flanges 13 are also configured so that when a subsequent cartridge 12 is slid along the guide rails 34 so that the front side 17 of its flange 13 abuts with the back side 21 of the flange 13 of a previously inserted cartridge 12, the exhaust port 28 in the subsequently inserted cartridge is longitudinally aligned with the aperture 30 which corresponds to that cartridge.

Thus, the means for aligning the exhaust ports 28 of filter cartridges 12 with apertures 30 are built into the collector chamber 11 and the filter cartridges 12. The means for laterally aligning the exhaust ports 28 with the apertures 30 comprises the opposing guide rails 34 being spaced apart the precise distance so that when a filter cartridge 12 is inserted therebetween, its exhaust port 28 is automatically in substantial lateral alignment with the apertures 30 positioned between the guide rails 34.

Likewise, the means for longitudinally aligning the exhaust ports 28 with the apertures 30 comprises the pivot clips 38 and flanges 13. The pivot clips 38 are positioned so that when the first filter cartridge 12 is inserted between guide rails 34 and the front side 17 of its flange 13 is moved into contact with the pivot clips 38, the exhaust port 28 of that cartridge is automatically in longitudinal alignment with the first aperture 30 positioned between the guide rails 34. The length of the flanges 13 are predetermined so that such longitudinal alignment occurs. The predetermined length of the flanges 13 also provides the means for longitudinally aligning the other filter cartridges to be inserted in a given row 52. As such, when the front side 17 of the flange 13 of a subsequently inserted filter cartridge 12 abuts the back side 21 of the flange 13 of a previously inserted and longitudinally aligned filter cartridge 12, the exhaust port 28 of that subsequent cartridge is aligned with its corresponding aperture 30 in ceiling wall 32, as shown in FIG. 6. As shown in FIG. 5, a separate alignment member 66 may be mounted within collector chamber 11 to accommodate flanges of varying shapes, such as circular flanges.

To make the installation of the filter cartridges as easy as possible, the present invention also provides means for supporting the filter cartridges 12 within the collector chamber 11 while the filter cartridges are being aligned therein. Thus, while a subsequent filter cartridge 12 is being slid into place, the previously inserted and aligned cartridges 12 are supported by their respective flanges 13 resting on the opposing guide rails 34, as shown in FIG. 6. For this purpose, the opposing guide rails 34 have a substantially L-shaped cross-section and are disposed on the ceiling wall 32 to form a pair of opposing ledges 33 extending in a plane spaced from and substantially parallel to ceiling wall 32, as shown in FIG. 4. The opposing ledges 33 have opposing ends 35 which are spaced apart from one another a distance less than the width of flanges 13. In addition, each of the ledges has an upper side 31 which faces the ceiling wall 32.

As shown in FIG. 3, a sufficient number of cartridges, in this case three, have been inserted between opposing guide rails 34 to fill the row 52. At this point, the locking bars 42 can be pivoted upwardly so that the vertical sides 43 thereof lift the flanged cartridges 12 and slightly compress the gaskets 36 of those cartridges against the ceiling wall 32 of the collector chamber 11. In this position, the gasket 36 of each filter cartridge 12 surrounds the corresponding aperture 30 to provide an airtight seal which prevents the filtered air flowing from the filter cartridge 12 into said aperture 30 from entering the collector chamber 11.

The locking bars 42 are then releasably locked in their second, horizontal position by clamping mechanism 46, as shown in FIGS. 3 and 5. The elongated hooked members 47 are pivoted upwardly and hooked into holes 56 in the front ends of the guide rails 34. The lever members 48 of the clamping mechanisms 46 are then pulled downwardly to clamp and lock the locking bars 42 in their second, horizontal position. After both locking bars for each row 52 have been clamped and locked in this manner, the cartridges 12 are completely installed in the collector chamber 11.

To remove the filter cartridges 12, the lever members 48 are pivoted upwardly to unhook the hooked members 47 from holes 56. The locking bars 42 are then pivoted downwardly to release the flanges 13 of filter cartridges 12, which can then be pulled out of the collector chamber 11 from between opposing guide rails 34.

Figure 7:
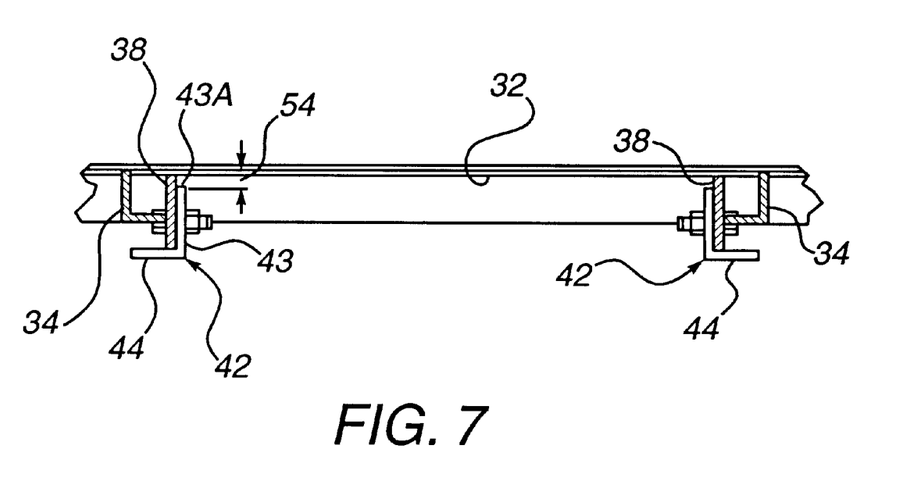
FIG. 7 is a cross-sectional view of the apparatus within the dust collector of the present invention for installing and aligning filter cartridges therein.

To insure that an airtight seal is formed between the cartridges 12 and the ceiling wall 32 of the collector chamber 11, the top edge 49 of the gasket 36 extends beyond the top edge 23 of flange 13. In addition, the gap 54 (see FIG. 7) between the free edge 43A of the vertical side 43 of each locking bar 42 in its horizontal position and the ceiling wall 32 is precisely formed so that the gaskets 36 are compressed sufficiently to form an airtight seal with the ceiling wall 32. The gap 54, however, is preferably not too narrow whereby the flange 13 would be crushed when the locking bar 42 is locked in its horizontal position.

In a first illustrative and preferred embodiment of the present invention, the flange 13 preferably has a height of ½ inch, while the gasket is also ½ inches in height and extends beyond the top edge 23 of flange 13 by about ⅜ inches in a direction substantially perpendicular to the plane of the flange 13, as shown in FIGS. 8 and 9. The gap 54 in this first preferred embodiment is maintained at a height or width of no less than ½ inch and no greater than 9/16 inches. In addition, the distance "D" between the bottom edge 25 of flange 13 and the top edge 49 of gasket 36 is maintained at about ⅞ inches. Thus, such dimensions of gap 54 and distance "D" insure that the gasket 36, which extends beyond the top edge 23 of flange 13 by about ⅜ inches, will be compressed from about 5/16 inches to about ⅜ of an inch when the locking bars 42 are pivoted to their horizontal position and locked in place.

In a second illustrative and preferred embodiment of the present invention, the flange 13 preferably has a height of ¾ inch, while the gasket is ⅜ inches in height and extends beyond the top edge 23 of flange 13 by about ¼ of an inch in a direction substantially perpendicular to the plane of the flange 13, as shown in FIGS. 8 and 9. The gap 54 in this second preferred embodiment is maintained at a height or width of no less than ¾ of an inch and no greater than 13/16 inches. In addition, the distance "D" between the bottom edge 25 of flange 13 and the top edge 49 of gasket 36 is maintained at about 1 inch. Thus, such dimensions of gap 54 and distance "D" in this second preferred embodiment insure that the gasket 36, which extends beyond the top edge 23 of flange 13 by about ¼ of an inch, will be compressed from about 3/16 inches to about ¼ of an inch when the locking bars 42 are pivoted to their horizontal position and locked in place.

Although the invention has been described in detail in the foregoing for the purpose of illustration, it is to be understood that such detail is solely for that purpose and that variations can be made therein by those of ordinary skill in the art without departing from the spirit and scope of the invention as defined by the following claims, including all equivalents thereof.

I claim:

1. A dust collector comprising:
   (a) a housing;
   (b) a collector chamber defined by said housing communicating with an air inlet conduit and an air outlet pathway of said dust collector, said collector chamber having at least one wall;
   (c) at least one filter cartridge having a first end with a flange disposed thereon and an exhaust port defined by said first end;
   (d) a gasket disposed on said flange surrounding said exhaust port;
   (e) at least one pair of opposing guide rails disposed within said collector chamber;
   (f) at least one aperture defined by said wall comprising part of said air outlet pathway and being positioned between said opposing guide rails so that when the flange of said at least one filter cartridge is inserted between said opposing guide rails, said exhaust port is in substantial lateral alignment with said aperture;
   (g) means for longitudinally aligning the exhaust port of said at least one filter cartridge with said aperture;
   (h) a locking bar corresponding to each of said guide rails, each of said locking bars being pivotally connected to a corresponding pivot clip mounted within said collector chamber, each of said locking bars having a free edge; and
   (i) means for securing each of said locking bars in a position wherein the free edge of each of said locking bars acts against the flange of said at least one filter cartridge disposed between said corresponding pair of opposing guide rails to releasably secure said at least one filter cartridge to said wall.

2. The dust collector of claim 1 having a plurality of apertures and a plurality of filter cartridges, the flange of each said filter cartridge having a front side and a back side wherein the exhaust port of a first filter cartridge is longitudinally aligned with a first aperture disposed between said opposing guide rails when said front side of the flange of said first filter cartridge is in contact with said pivot clips, and the exhaust port of each filter cartridge subsequently inserted between said opposing guide rails is longitudinally aligned with a corresponding aperture disposed between said opposing guide rails when the front side of the flange of said subsequently inserted filter cartridge contacts the back side of the flange of a previously inserted filter cartridge which has been longitudinally aligned with a corresponding aperture disposed between said opposing guide rails.

3. The dust collector of claim 1, wherein said gasket extends beyond said flange in a direction substantially perpendicular to said flange.

4. The dust collector of claim 3, wherein said gasket extends beyond said flange by about ¼ of an inch to about ⅜ inches.

5. The dust collector of claim 3 wherein said gasket surrounds said aperture and is compressed against said wall when said locking bars are secured in said position.

6. The dust collector of claim 4, wherein said gasket surrounds said aperture and is compressed against said wall when said locking bars are secured in said position.

7. The dust collector of claim 6, wherein said flange has a bottom edge and said gasket has a top edge, and the distance between the top edge of said gasket and the bottom edge of said flange is greater than the distance between the free edge of each locking bar and said wall, when said locking bars are secured in said position.

8. The dust collector of claim 7, wherein the distance between the top edge of said gasket and the bottom edge of said flange is from about 3/16 inches to about 3/8 inches greater than the distance between the free edge of each locking bar and said wall, when said locking bars are secured in said position.

9. The dust collector of claim 3, wherein said gasket is made of silicon rubber.

10. The dust collector of claim 3, wherein said gasket is made of neoprene.

11. A method of installing a plurality of filter cartridges, each having an exhaust port, a gasket surrounding said exhaust port, and a flange, into a dust collector, which comprises: a collector chamber, a plurality of rows of spaced apart apertures defined by a wall of said collector chamber, each of said rows of spaced apart apertures being positioned between a pair of opposing guide rails disposed on said wall, each of said guide rails having a first end, a pivot clip disposed within said collector chamber in proximity with the first end of each of said guide rails, a locking bar pivotally disposed on each of said pivot clips for pivotable movement between a first position wherein said locking bar extends along a line intersecting the plane said wall, and a second position wherein said locking bar extends along a line substantially parallel to said wall, each of said locking bars having a free edge, and means for securing said locking bars in said second position; comprising the steps of:

(a) inserting the flange of one of said filter cartridges between a pair of opposing guide rails bordering one of said rows of spaced apart apertures;

(b) moving said one filter cartridge towards the first ends of said guide rails until the flange of said first filter cartridge is in contact with said pivot clips wherein the exhaust port of said one filter cartridge is substantially aligned with a first aperture in said row;

(c) inserting the flange of a subsequent filter cartridge between said pair of opposing guide rails;

(d) moving said subsequent filter cartridge towards said one filter cartridge until the flange of said subsequent filter cartridge abuts the flange of a previously inserted and aligned filter cartridge wherein the exhaust port of said subsequent filter cartridge is substantially aligned with a corresponding aperture in said row;

(e) repeating steps (c) and (d) until said row is filled with filter cartridges;

(f) moving each of the locking bars towards said wall to said second position where the free edge of each locking bar acts against said flanges and whereby said gaskets of said filter cartridges within said row contact said wall and surround their corresponding apertures;

(g) securing said locking bars in said second position; and (h) repeating steps (a) through (g) for each of said rows within said collector chamber.

* * * * *